US012696374B2

(12) United States Patent
Choi et al.

(10) Patent No.: US 12,696,374 B2
(45) Date of Patent: Jul. 28, 2026

(54) BESSEL TUBE FOR DRIVING GASEOUS MOLECULES AND NANOPARTICLES INTO LINEAR MOTION

(71) Applicant: Space Age Technologies, LLC, Poquoson, VA (US)

(72) Inventors: Sang H. Choi, Poquoson, VA (US); Han Samuel Choi, Orlando, FL (US); Robert W. Moses, Poquoson, VA (US); Kyeong Ja Kim, Vallejo, CA (US)

(73) Assignee: SPACE AGE TECNOLOGIES, LLC, Poquoson, VA (US)

(*) Notice: Subject to any disclaimer, the term of this patent is extended or adjusted under 35 U.S.C. 154(b) by 323 days.

(21) Appl. No.: 18/299,598

(22) Filed: Apr. 12, 2023

(65) Prior Publication Data

US 2023/0328872 A1 Oct. 12, 2023

Related U.S. Application Data

(60) Provisional application No. 63/330,023, filed on Apr. 12, 2022.

(51) Int. Cl.
*H05H 9/00* (2006.01)
*H05H 7/22* (2006.01)

(52) U.S. Cl.
CPC ................ *H05H 9/00* (2013.01); *H05H 7/22* (2013.01)

(58) Field of Classification Search
CPC .................................. H05H 9/00; H05H 7/22
See application file for complete search history.

(56) References Cited

U.S. PATENT DOCUMENTS 3,218,562 A * 11/1965 Serduke .................. H05H 5/06 376/127
5,191,517 A * 3/1993 Stephenson .............. H05H 5/04 363/59

(Continued)

FOREIGN PATENT DOCUMENTS

WO WO-2018215622 A1 * 11/2018 ............... H05H 7/22
WO PCT/US23/018384 4/2023

OTHER PUBLICATIONS

Choi, et. al., Lunar Volatiles Collector, AIAA SCITECH 2022 Forum, Published Dec. 29, 2021. (Year: 2021).*

(Continued)

*Primary Examiner* — Alexander H Taningco
*Assistant Examiner* — Pedro C Fernandez
(74) *Attorney, Agent, or Firm* — STAAS & HALSEY LLP

(57) ABSTRACT

A device and method that creates linear motion or acceleration of fine particles and molecules are described. The device includes a plurality of ring electrodes arranged along an axis so that a cylindrical harmonic field is formed when electrical voltage is applied separately to each ring of the plurality of rings cylindrical harmonic field. A method of driving gaseous molecules and nanoparticles in linear motion by operating a device that includes a plurality of ring electrodes arranged along an axis. The method includes providing gaseous molecules or nanoparticles in a high vacuum environment, applying an electrical voltage to each ring of the plurality of rings to form a cylindrical harmonic field that includes a drift axis, and aligning and accelerating the gaseous molecules or nanoparticles along the drift axis for storage, pumping out, or separation of the gaseous molecules or nanoparticles.

14 Claims, 9 Drawing Sheets

(56) References Cited

U.S. PATENT DOCUMENTS

| | | | | |
|---|---|---|---|---|
| 9,750,122 | B1 * | 8/2017 | Elizondo-Decanini | H05H 5/06 |
| 2002/0084427 | A1 * | 7/2002 | Saadatmand | H05H 9/00 250/492.1 |
| 2015/0340221 | A1 * | 11/2015 | Benner | H01J 49/10 250/288 |

OTHER PUBLICATIONS

Datta, S., *Electronic Transport in Mesoscopic Systems*, Cambridge University Press, 1995, ISBN: 0-521-41604-3.
Bandfield, J.L., Poston, M.J., Klima, R.L., and Edwards, C.S., "Widespread distribution of OH/H2O on the lunar surface inferred from spectral data", Nature Geoscience 11, pp. 173-177, 2018.
Slyuta, E.N., Abdrakhimov, A.M., and Galimov, E.M., "The Estimation of Helium-3 Probable Reserves in Lunar Regolith", Lunar and Planetary Science XXXVIII, 2007. https://www.lpi.usra.edu/meetings/lpsc2007/pdf/2175.pdf.
Lasker, J., "Race to the Moon for Nuclear Fuel", Science, Space. Dec. 15, 2006.
Pontin, M.W., "Mining the Moon", MIT Technology Review, Aug. 23, 2007. https://www.techologyreview.com/s/408558/mining-the-moon/.
Shea, D.A. and Morgan, D., "The Helium-3 Shortage: Supply, Demand, and Options for Congress", Congressional Research Service (CRS) Report for Congress #7-5700, R41419, Dec. 22, 2010.
Anderson, S.T., "Economics, Helium, and the U.S. Federal Helium Reserve: Summary and Outlook", Natural Resources Research, vol. 27, No. 4, pp. 455-477, Oct. 2018. doi: 10.1007/s11053-017-9359-y.
Lockley, A., "Helium-3 prices are out of this world", Exponential Investor, Oct. 11, 2017. https://www.exponentialinvestor.com/commodities/helium-3-prices-are-out-of-this-world/.
Sang H. Choi et al., "Lunar Volatiles Collector", AIAA SciTech, Jan. 5, 2022.
International Search Report issued in International Application PCT/US2023/018384 dated Sep. 6, 2023.
IPRP (PCT/IB/373) (Oct. 8, 2024) and the Written Opinion of ISA (PCT/ISA/237) issued in counterpart International Application No. PCT/US2023/018384 on Sep. 6, 2023 (5 pages).
Korean Office Action dated May 19, 2026 for counterpart Korean Application No. 10-2024-7034092.

* cited by examiner

BESSEL TUBE FOR DRIVING GASEOUS MOLECULES AND NANOPARTICLES INTO LINEAR MOTION

CROSS-REFERENCE TO RELATED APPLICATIONS

This application claims the benefit of U.S. Provisional Application No. 63/330,023, filed Apr. 12, 2022, the contents of which is incorporated herein by reference in its entirety.

FIELD

The invention generally relates to the linear motion of gaseous molecules and nanoparticles. More specifically, the invention relates to Bessel Tubes for accelerating fine particles, gaseous atoms, and gaseous molecules.

BACKGROUND

Current attempts to create a linear motion or acceleration of fine particles and molecules even in the devices like mass spectrometer and vacuum pumps rely on the pressure differences that might be created by a pinhole or mechanically created. However, in a vacuum environment, such motion of fine particles and molecules is not readily permitted by pressure differences.

Current systems in mass spectrometers or vacuum pumps rely on pressure difference to drive the objective mass, such as gaseous atoms and molecules, through a channel of quadruple poles to separately collect species of mass. This system cannot be used in a vacuum environment, as pressure differences cannot be sustained.

The state-of-the-art devices that create linear motion or acceleration of fine particles, gaseous atoms, and gaseous molecules use the difference in pressure or electric or magnetic fields. In a mass-spectrometer, gaseous atoms or molecules in a chamber are pumped down to a low pressure regime through a conduit which has a diaphragm with a pinhole. These gases which pass through the pinhole are ionized and have a linear motion only in an axial direction. After passing a pinhole, these gas particles run mostly through the channel where there are magnetic fields before being deflected by quadruple poles in the devices, such as mass spectrometer. These fine particles, gaseous atoms, and gaseous molecules have long mean free paths in low pressure before collisions. The gas particles which have a vector component aligned with the axial direction can only pass through the pinhole which is at the axial center. The other gas particles which are not aligned with the axial direction at upstream before the pinhole undergo multiple collision processes until aligning with the axial center.

However, in a vacuum environment, gas particles have random motion to disperse into every direction. Guiding fine particles and molecules with random motion, typically in a vacuum environment, is extremely difficult.

SUMMARY

A device that includes a plurality of ring electrodes arranged along an axis so that a cylindrical harmonic field is formed when electrical voltage is applied separately to each ring of the plurality of rings cylindrical harmonic field.

The same electrical voltage may applied to each ring electrode of the plurality of ring electrodes. A different electrical voltage may be applied to each ring electrode of the plurality of ring electrodes. The cylindrical harmonic field may be configured to create a drift axis along which molecules and nanoparticles are aligned and accelerated.

A method may be used for driving gaseous molecules and nanoparticles in linear motion by operating a device that includes a plurality of ring electrodes arranged along an axis. The method includes: providing gaseous molecules or nanoparticles in a high vacuum environment; applying an electrical voltage to each ring of the plurality of rings to form a cylindrical harmonic field that includes a drift axis; and aligning and accelerating the gaseous molecules or nanoparticles along the drift axis for storage, pumping out, or separation of the gaseous molecules or nanoparticles.

The gaseous molecules or nanoparticles may be provided at a pressure of about 10-7 to 10-3 mbar. The applying the electrical voltage may be performed by applying the same voltage to each ring of the plurality of rings. The applying the electrical voltage may be performed by applying a different voltage to each ring of the plurality of rings. The applying the electrical voltage may be performed by applying a gradually increasing or gradually decreasing voltage to each ring of the plurality of rings.

BRIEF DESCRIPTION OF DRAWINGS

These and other aspects and advantages will become more apparent and more readily appreciated from the following description of the examples, taken in conjunction with the accompanying drawings of which.

DETAILED DESCRIPTION

Reference will now be made in detail to examples of an invention, the examples being illustrated in the accompanying drawings. In this regard, the examples may have different forms and should not be construed as being limited to the descriptions set forth herein. In order to further clearly describe features of the examples, descriptions of other features that are well known to one of ordinary skill in the art may be omitted here.

The words "a," "an" and "the" are intended to include plural forms of elements unless specifically referenced as a single element. The term "at least" preceding a listing of elements denotes any one or any combination of the elements in the listing. In other words, the expression "at least one of . . . " when preceding a list of elements, modifies the entire list of elements and does not modify the individual elements of the list.

The term of "and/or" includes a plurality of combinations of relevant items or any one item among a plurality of relevant items.

The terms "comprise(ing)," "include(ing)," and "have (ing)" when used in this specification, specify the presence of stated features, functions, processes/operations, elements, and/or components, but do not preclude the presence or addition of one or more other features, functions, processes/operations, elements, components, and/or groups thereof.

In the specification, when an element is "coupled" to another element, the elements may not only be "directly connected", but may also be "connected" via another element therebetween. The "coupling" may be mechanical, electrical, optical and/or by way of data communication. Also, when a region "includes" an element, the region may further include another element instead of excluding the other element, unless otherwise differently stated.

The invention relates to a Bessel Tube that is able to guide gas particles into linear motion or acceleration by realigning the vector components of gas particles in random motion into the axial direction. The Bessel Tube can be used to capture and accelerate gaseous particles through drift axes using a circularly harmonic field or ring field generator. A high vacuum environment is an environment with a pressure of less than about $10^{-7}$ mbars, preferably about $10^{-7}$ to $10^{-3}$ mbars.

Figure 1:
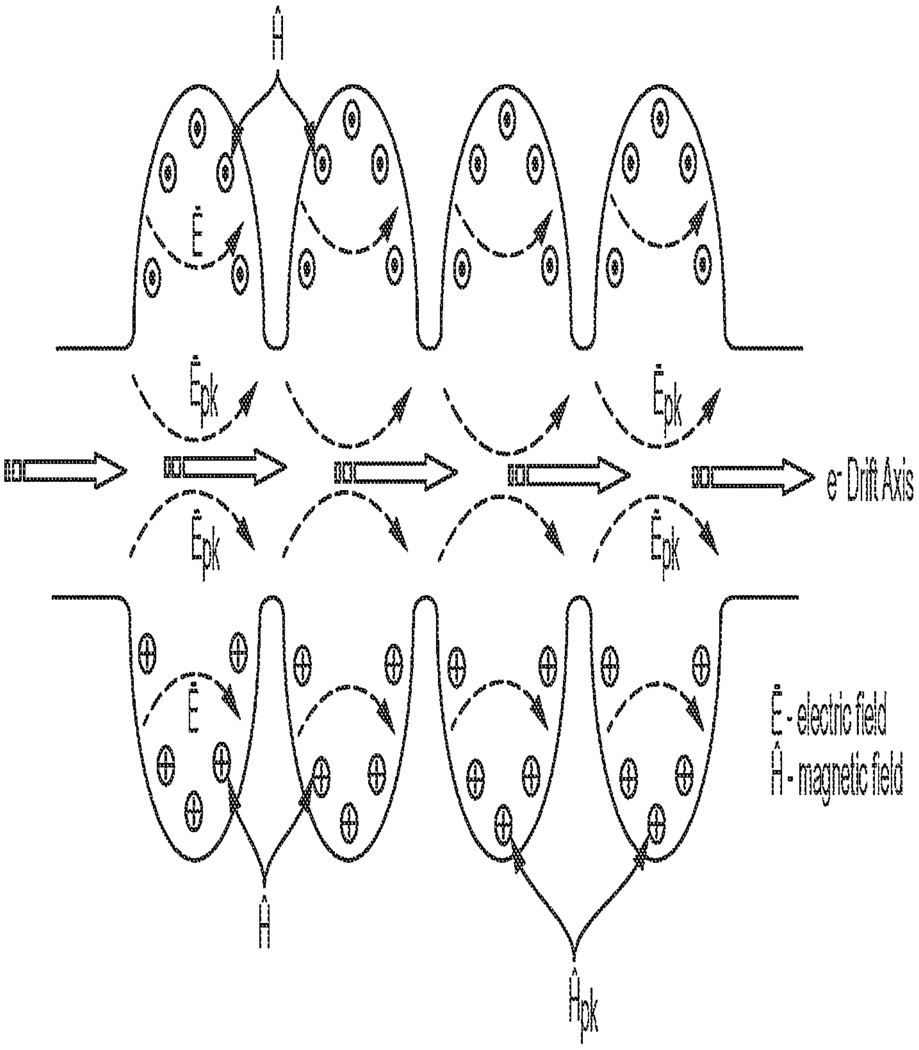
FIG. 1 is a view of a cylindrical harmonic generator in a hypocycloidal mode for accelerating electrons.

A circularly harmonic field, in principle, establishes the cylindrical harmonic condition on the basis of axi-symmetric electric polar arrangement. A typical example of the axi-symmetric electric polar arrangement is the arm-chair style of carbon nanotubes (CNT) with zero chirality which theoretically exhibit a ballistic transport property of electrons. The principle of nano-scale electron drift channel is clearly well-defined by the theory of mesoscopic conductor. Another example can be seen from the electron acceleration concept along the drift axis where the equipotential of E-field develops a cylindrical harmonic in a hypocycloidal mode as shown in FIG. 1. The helicity of a particle is defined as the projection of a spin vector $\vec{s}$ in the direction of its momentum vector $\vec{p}$, as $$\vec{h} = \frac{\vec{s}\cdot\vec{p}}{|\vec{s}\cdot\vec{p}|}.$$

Therefore, if a particle's spin vector points in the same direction as the momentum vector, the helicity is positive, and if they point in opposite directions, the helicity is negative. However, the helicity of a massless particle is always equal to its chirality. The helicity of a particle is a Lorentz invariant. A helical structure of polar elements creates a scattering mode in which the static field pattern of helically arranged field elements within the helical tube deviates the vector field of motion. If the helicity of ring field is zero, it will appear to be hypocycloidal as described in FIG. 1. Suppose that the helical tube is axially symmetric and uniform in diameter and has no helicity. The hypocycloidal fields (HCF) from the polar elements (i.e. E-field) of helical tube eventually develop equipotential field lines along the center axis of a tube. The hypocycloidal dips are actually filled up by the superposition of fields neighboring each other. Hence, the HCF is relaxed to be a pseudo linear field (even if a minute helicity exists) along the axial direction, thus forming a cylindrical harmonic (CH) condition. Such a CH condition warrants the ballistic transport of electrons, charged particles, or particles with dipole moment through the axially symmetric drift channel. Such a phenomenon is enabled by the existence of cylindrical harmonic if the helicity of polar field is negligible.

Figure 2:
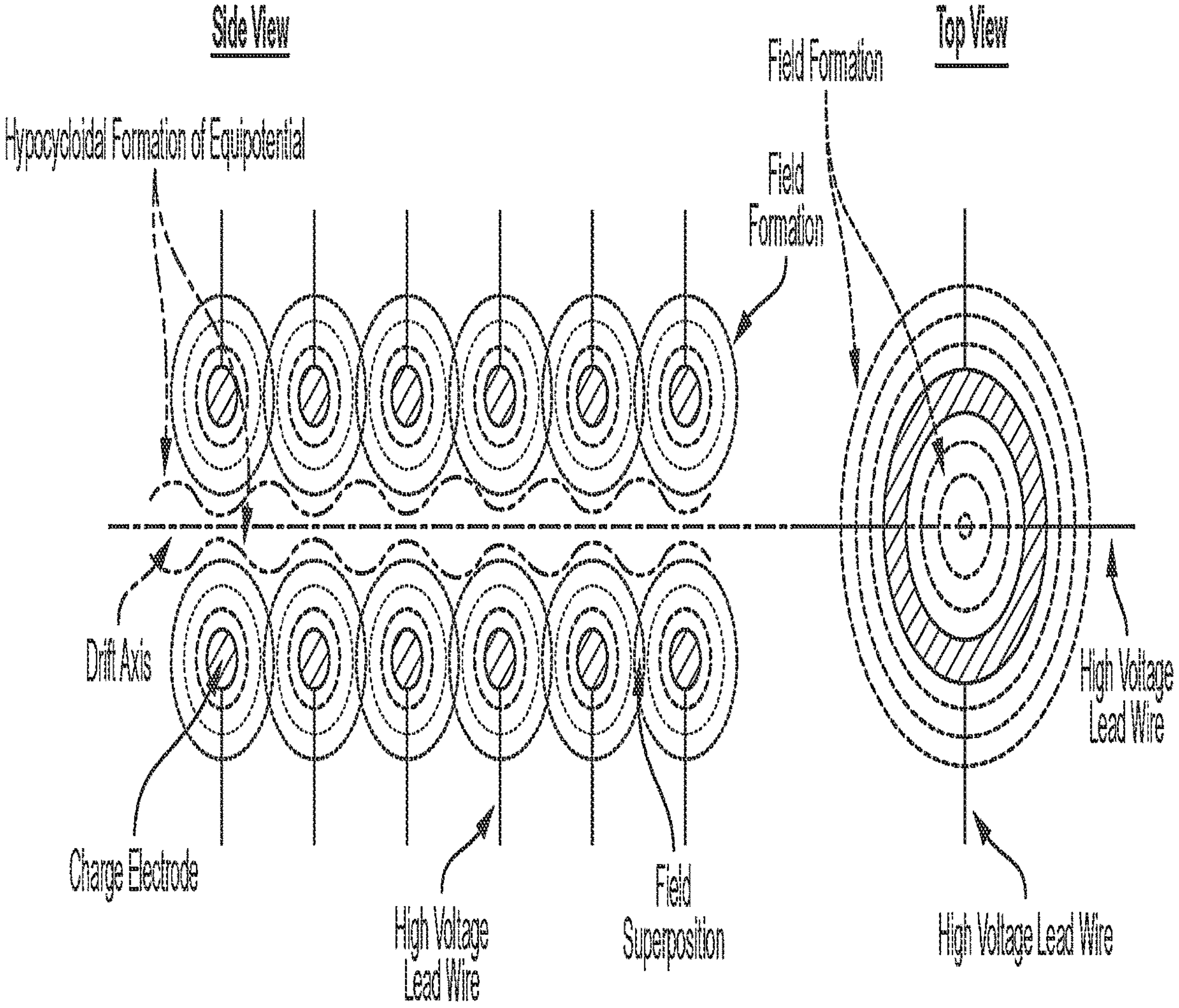
FIG. 2 is a hypocycloidal field formation.
Figure 3:
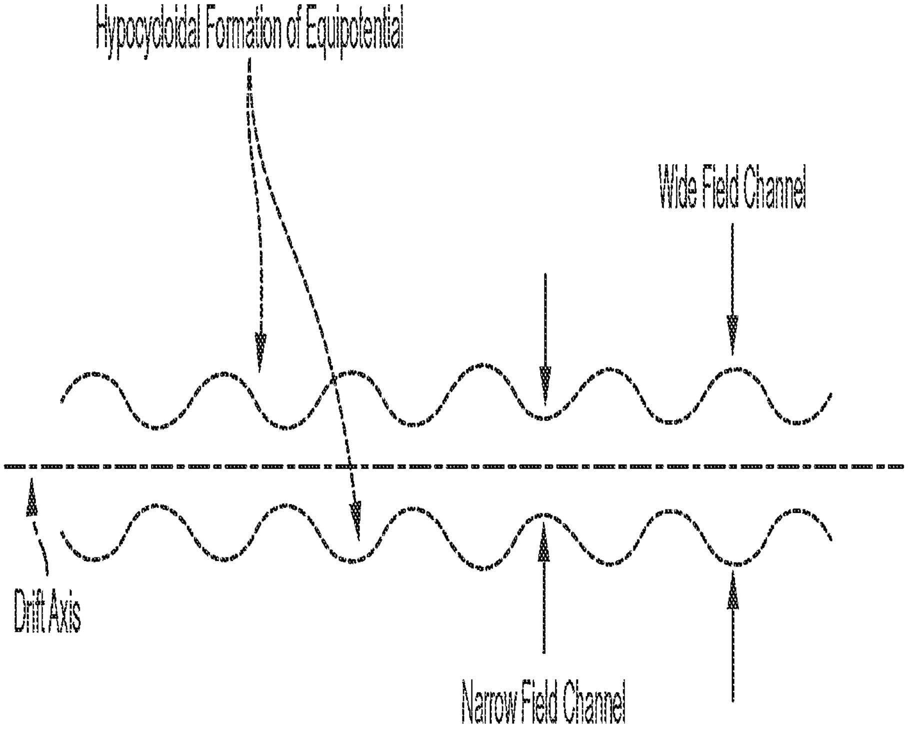
FIG. 3 is a hypocycloidal field of equipotential.

FIG. 2 describes the side and top cross section views of device configuration which is an axially symmetric linear array of ring electrodes separated with equal gap distance. The ring fields created by each ring electrode are superposed to form two hypocycloidal equipotential lines shown in FIG. 2. The hypocycloidal field actually forms a tube along the axis, just like a corrugated tube (see FIG. 3). This hypocycloidal field of equipotential is very similar to the field lines, $\overline{E}_{pk}$ appeared in FIG. 1, that forms an equipotential tube with a cylindrical harmonic condition. FIG. 3 describes the tube of equipotential hypocycloidal field formed by sequential ring fields of the device described herein. Such an equipotential tube satisfies the condition of cylindrical harmonic field. In FIG. 3, the narrow field channel signifies the location of ring electrodes and the wide field channel, on the other hand, the gaps where field superposition takes place between the ring electrodes.

Consider determining the potential of a single unit source like a dipole element located at (ρ0, φ0, z0) inside a conducting hypocycloidal tube (cylindrical with periodic mode) which is bounded by the periodic length z=−L and z=L of a hypocycloid and by the radius of hypocycloidal cylinder ρ=a. A single unit source of dipole element is assumed as q/(4πϵ_0)=1 in MKS units. The cylindrical harmonics (CH) are a set of linearly independent functions that are solutions to Laplace's differential equation, ∇2E=0, expressed in cylindrical coordinates, ρ (radial coordinate), φ (polar angle), and z (length).

$$E_n(k,\rho,\varphi,z)=H_n(k,\rho)\Phi_n(\varphi)Z(k,z) \quad (1)$$

By superposition principle, a separate solution to Laplace's equation is expressed by $$\frac{\ddot{H}}{H} + \frac{1}{\varrho}\frac{\ddot{H}}{H} + \frac{1}{\varrho^2}\frac{\ddot{\Phi}}{\Phi} + \frac{\ddot{Z}}{Z} = 0 \quad (2)$$

where the ρ-dependent term is given by Bessel functions (which occasionally are called cylindrical harmonics). Since the potential is bounded by the hypocycloidal planes along the z axis which is in a periodic mode of hypocycloid, the Z part of the equation is a function of z alone, and must therefore be equal to a constant:

$$\frac{\ddot{Z}}{Z} = k^2 \quad (3)$$

where the Z(k,z) function is taken to be periodic. In the above equation, k is a complex number so that $$\begin{aligned} Z(k, z) &= e^{kz} \text{ or } e^{-kz} && \text{for } k \text{ is real} \quad (4) \\ &= e^{i|k|z} \text{ or } e^{-i|k|z} && \text{for } k \text{ is imaginary} \end{aligned}$$

which clearly shows periodicity of hypocycloidal field along the z-axis. The axial symmetry condition sets $$\frac{\ddot{\Phi}}{\Phi} = -n^2 \quad (5)$$

where φ is periodic, n is taken as a non-negative integer. Under the set condition of periodicity of a dipole charge that exists inside a conducting hypocycloidal tube, Eq. (2) is ended up $$\varrho^2\frac{\ddot{H}}{H}+\varrho\frac{\dot{H}}{H}+k^2\varrho^2=n^2 \tag{6}$$

Eq. (6) for ρ is a form of Bessel's equation. When k is a real number, a real solution of Eq. (6) is $$H_n(k,\varrho)=J_n(k\varrho) \text{ or } Y_n(k\varrho) \tag{7}$$

where $J_n$ and $Y_n$ are ordinary Bessel functions. When k is an imaginary number, a real solution of Eq. (6) is $$H_n(k,\varrho)=I_n(|k|\varrho) \text{ or } K_n(|k|\varrho) \tag{8}$$

where $I_n$ and $K_n$ are modified Bessel functions. The cylindrical harmonics for (k,n) are now the product of these solutions and the general solution to Laplace's equation is given by a linear combination of these solutions:

$$E(\varrho,\varphi,z)=\Sigma_n\int d|k|A_n(k)H_n(k,\varrho)\Phi_n(\varphi)Z(k,z) \tag{9}$$

where $A_n(k)$ are constants with respect to cylindrical coordinates and the limits of the summation and integration are determined by the boundary conditions of the domain to be considered. Accordingly, the integral may be replaced by a sum for appropriate boundary conditions. The orthogonality of the $J_n(x)$ is often very useful when finding a solution to a particular problem. When $H_n(k\varrho)$ is simply $J_n(k\varrho)$, the orthogonality of $J_n$, along with the orthogonality relationships of $\Phi_n(\varphi)$ and Z(k, z) allow the constants to be determined.

Since the potential must be zero at the origin, we take the $H_n(k\varrho)$ function to be the ordinary Bessel function $J_n(k\varrho)$, and it must be chosen so that one of its zeroes lands on the bounding cylinder. For the measurement point below the source point on the z axis, the potential will be:

$$E(\varrho,\varphi,z)=\sum_{n=0}^{\infty}\sum_{r=0}^{\infty}A_{nr}J_n(k_{nr}\varrho)\cos(n(\varphi-\varphi_0))\sinh(k_{nr}(L+z)) \text{ where } z\le z_0 \tag{10}$$

In Eq. (10), $k_{nr}a$, when $\varrho=a$, becomes the r-th zero of $J_n(z)$ and from the orthogonality relationships for each of the functions, $A_{nr}$ is determined as:

$$A_{nr}=\frac{4(2-\delta_{no})}{a^2}\frac{\sinh k_{nr}(L+z_0)}{\sinh 2k_{nr}L}\frac{J_n(k_{nr}\varrho_0)}{k_{nr}[J_{n+1}(k_{nr}a)]^2} \tag{11}$$

Accordingly, for the above source point within hypocycloidal field, a single unit source of dipole element that is assumed as $q/4\pi\epsilon_0=1$ in MKS units is affected by $$E(\varrho,\varphi,z)=\sum_{n=0}^{\infty}\sum_{r=0}^{\infty}A_{nr}J_n(k_{nr}\varrho)\cos(n(\varphi-\varphi_0))\sinh(k_{nr}(L-z)) \text{ wher } z\ge z_0 \tag{12}$$

$$A_{nr}=\frac{4(2-\delta_{no})}{a^2}\frac{\sinh k_{nr}(L-z_0)}{\sinh 2k_{nr}L}\frac{J_n(k_{nr}\varrho_0)}{k_{nr}[J_{n+1}(k_{nr}a)]^2} \tag{13}$$

When $\varrho=0$, E(0, φ, z) is at the maximum in potential and when $\varrho=a$ or |z|=L, E(a, φ, L)=0.

As indicated by Eqs. (12, 13), such a CH condition warrants the ballistic transport of electrons, charged particles, or particles with dipole moment through the axially symmetric drift channel. Such a phenomenon is enabled by the existence of cylindrical harmonic condition if the helicity of ring field or polar field is negligible.

Figure 4:
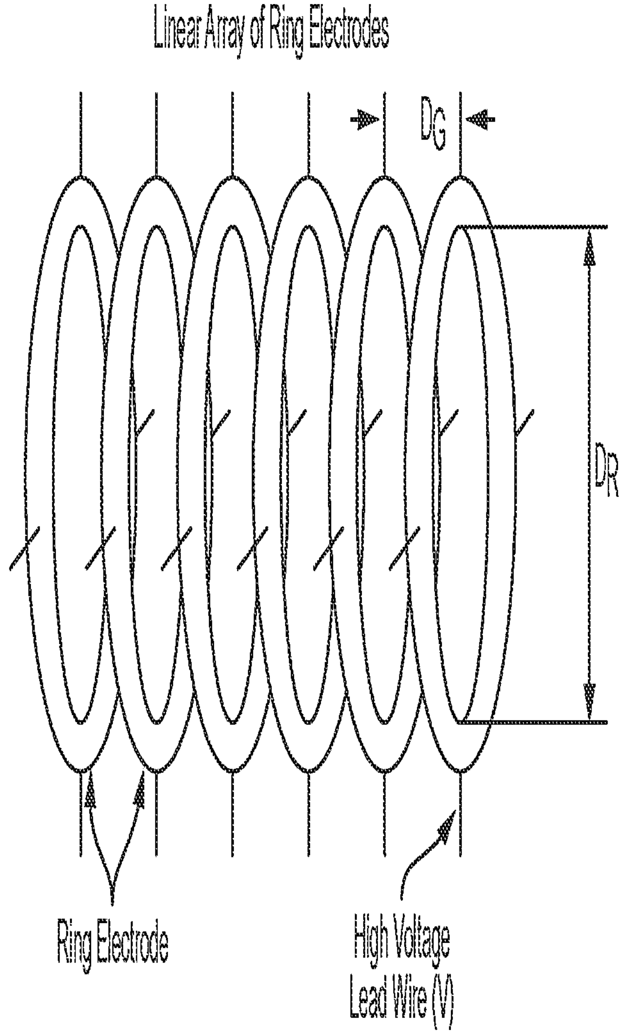
FIG. 4 is a simple view of a Bessel tube.

FIG. 4 shows how the ring electrodes are linearly arranged along the cylindrical axis. In FIG. 4, the gap distance ($D_G$) between the rings, the diameter ($D_R$) of ring electrode, the applied voltage and the number of lead wires on each ring are very important parameters to determine the performance of the invented Bessel Tube device. The gap distance ($D_G$) between the rings and the diameter ($D_R$) of ring electrode in association with the applied voltage will determine the shape of hypocycloidal field formation. If the gap distance ($D_G$) is wide, it reduces the superposition level of two field from neighboring electrodes and consequently enlarge the difference between the ridge and valley of hypocycloidal form. On the other hand, if the gap distance ($D_G$) is narrow, it increases the superposition level that causes the difference between the ridge and valley of hypocycloidal form to be relaxed. Or in some case when the gap ($D_G$) is too close, the superposition becomes so dominant that the shape of hypocycloidal form shown in FIG. 3 is changed like a 180 degree phase shifted. In this case the superposed field is bigger than the field strength of ring electrode. However this change does not alter the cylindrical harmonic condition for driving particles through. The hypocycloidal form of equipotential field is also affected by the applied voltage. When high voltage is applied, it increases the difference between the ridge and valley of hypocycloidal form at the given $D_G$ and $D_R$. The shape of hypocycloidal form determines the pull and push forces of particles. Accordingly, the Bessel Tube can be designed for driving particles into linear motion with the specific gap distance ($D_G$), the diameter ($D_R$) of ring electrode, and the applied voltage to meet the application requirements.

The number of lead wires for high voltage application determines the smoothness of circumferential field formation along the ring electrode. The instantaneous field strength where the lead wire is connected to the ring electrode is stronger than elsewhere. If the circumferential field is not uniformly established, this point will become the point where the kinetic energy of particles is dissipated or simply says that it becomes a scattering local.

Figure 5:
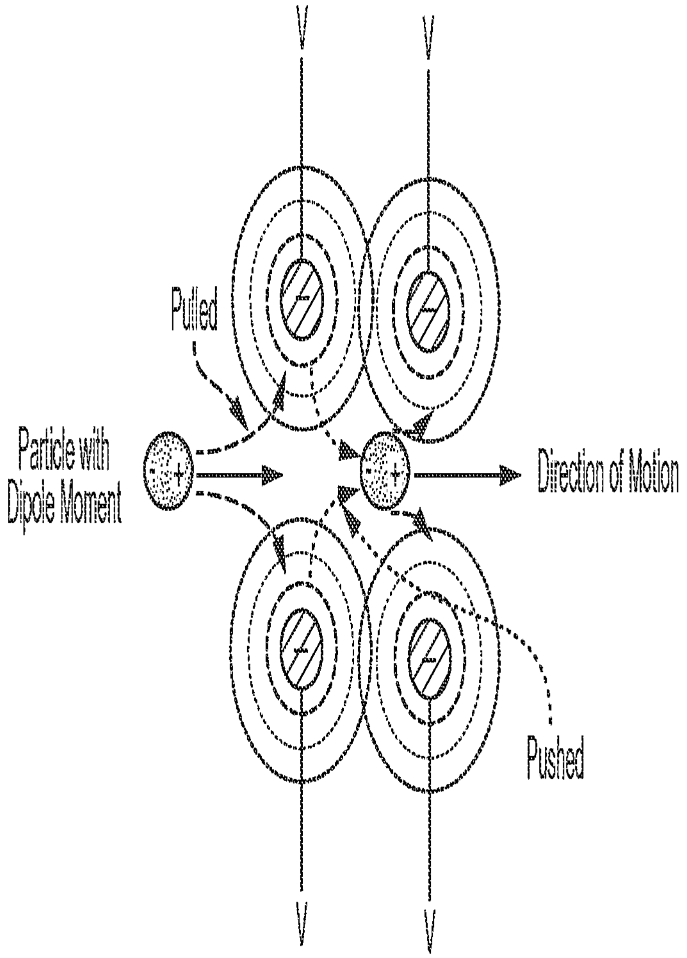
FIG. 5 is a view of electrically charged or ionized particles.

Particles electrically charged or ionized or with dipole moment can be pulled and accelerated into the drift axis of hypocycloidal equipotential tube because of the opposite charge between the particle and the ring field as shown in FIG. 5. As soon as the particles pass a narrow field channel where a ring electrode with ring field is located, the particles are pushed further by the interaction of same charge. Such an interaction of pull and push continues through the hypocycloidal field along the drift axis until the ring field ends.

Figure 6:
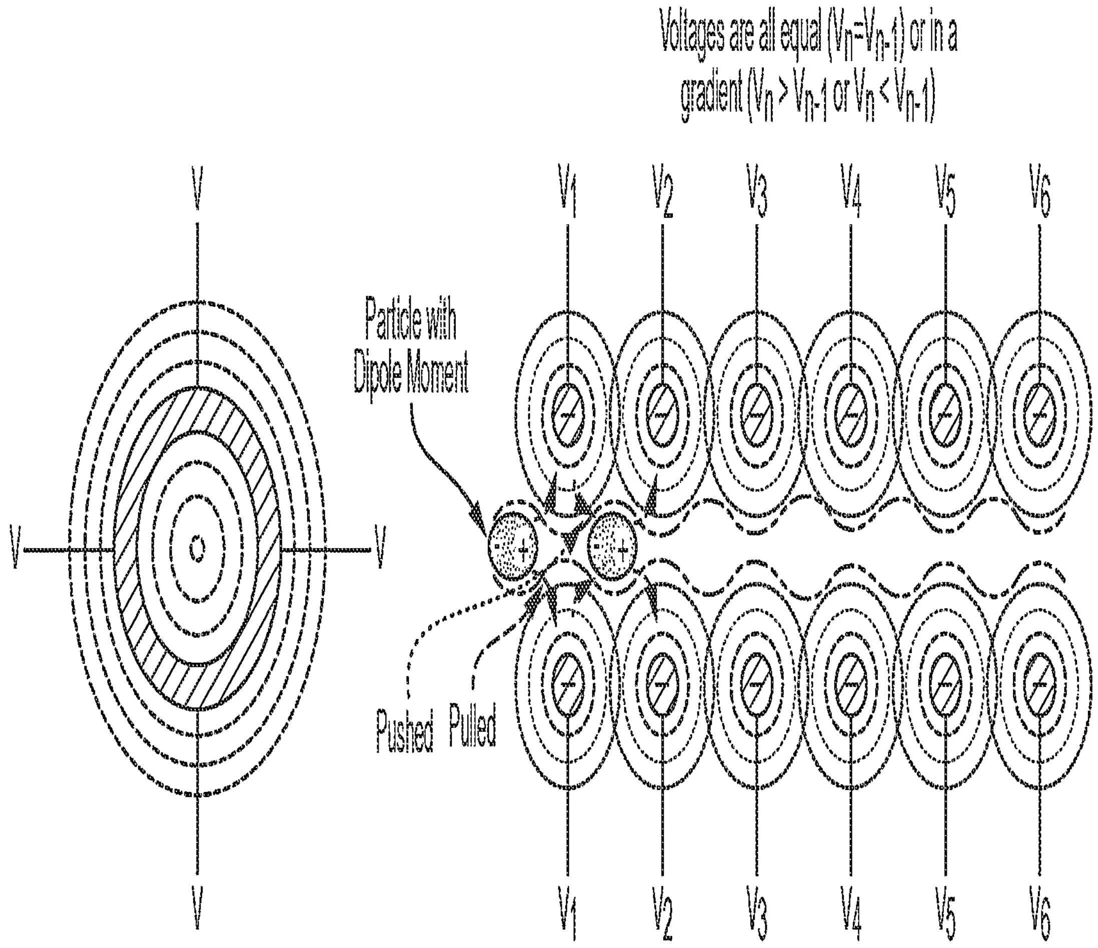
FIG. 6 shows multiple units of ring electrodes in a linear array

FIG. 6 shows the applied voltage to each ring electrode. The applied voltages on each ring electrode can be arranged for the same, the steep or mild incremental, or the steep or mild decremental based on the operational requirements and the number density of particles to accelerate and pass the particles with certain velocity. Or else the applied voltage is selectively and sequentially fed into the ring electrode rather than applying voltage to every ring electrode.

Figure 7:
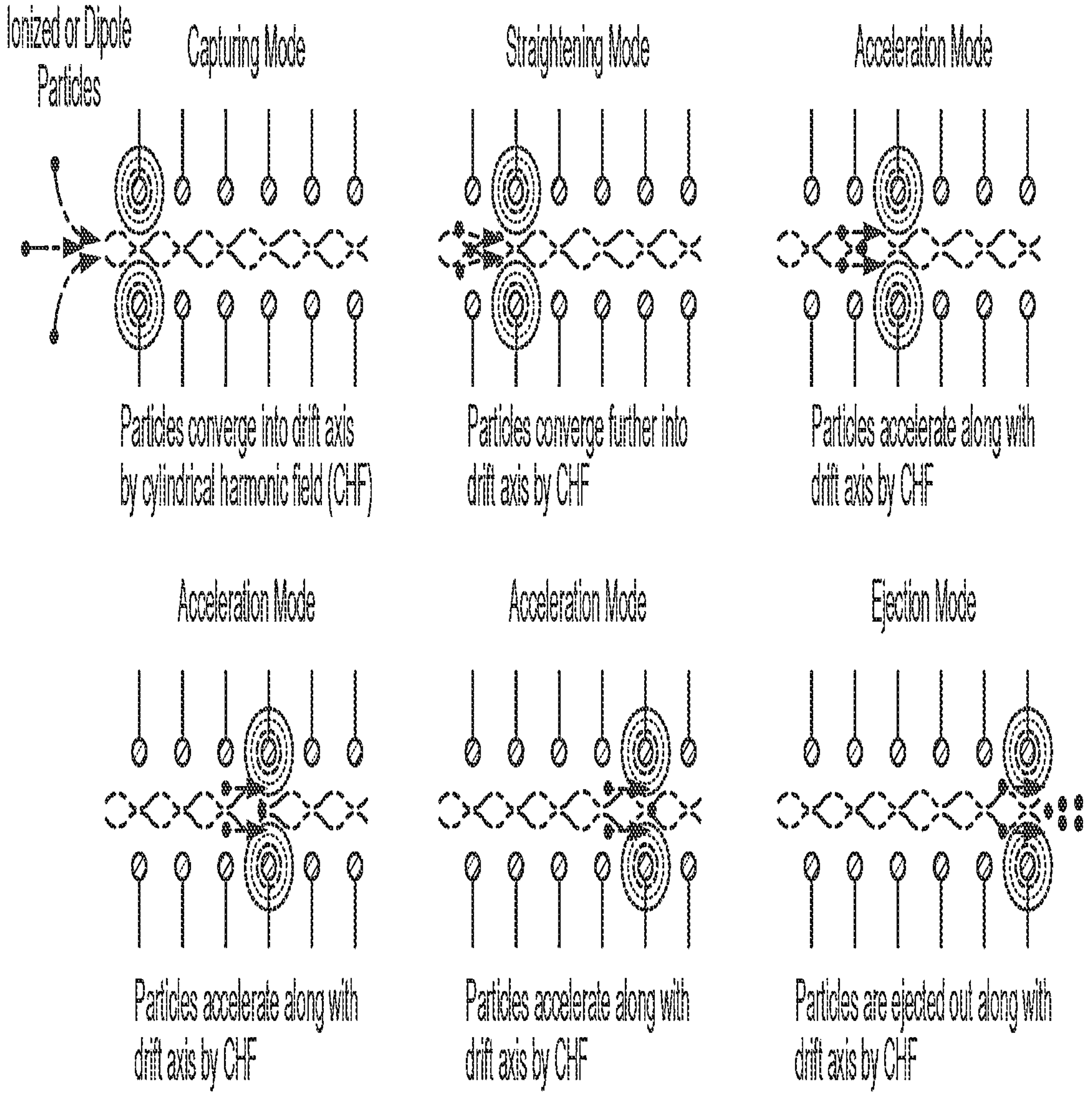
FIG. 7 is another view of multiple units of ring electrodes in a linear array.

FIG. 7 shows another version of Bessel Tube that runs the applied voltage starting from the first ring electrode and down to the next ring electrode with a certain time interval and going down to the third one with the same time interval until sequentially to the end. When a certain level of voltage is applied to the first ring electrode, the particles in the vicinity are pulled into the axial center of ring field induced by the ring electrode. When the following ring electrode get the voltage after the first ring electrode is disconnected by switch, the particles are aligned their directions of motion further with the drift axis and accelerated by pulling from the ring field. This process is repeated sequentially from one ring electrode to the next one by switching process of the applied voltage as shown in FIG. 7. The level of applied voltage is pretty much determined by the number density of particles (or pressure). The denser the particles are, the higher the applied voltage is.

Figure 8:
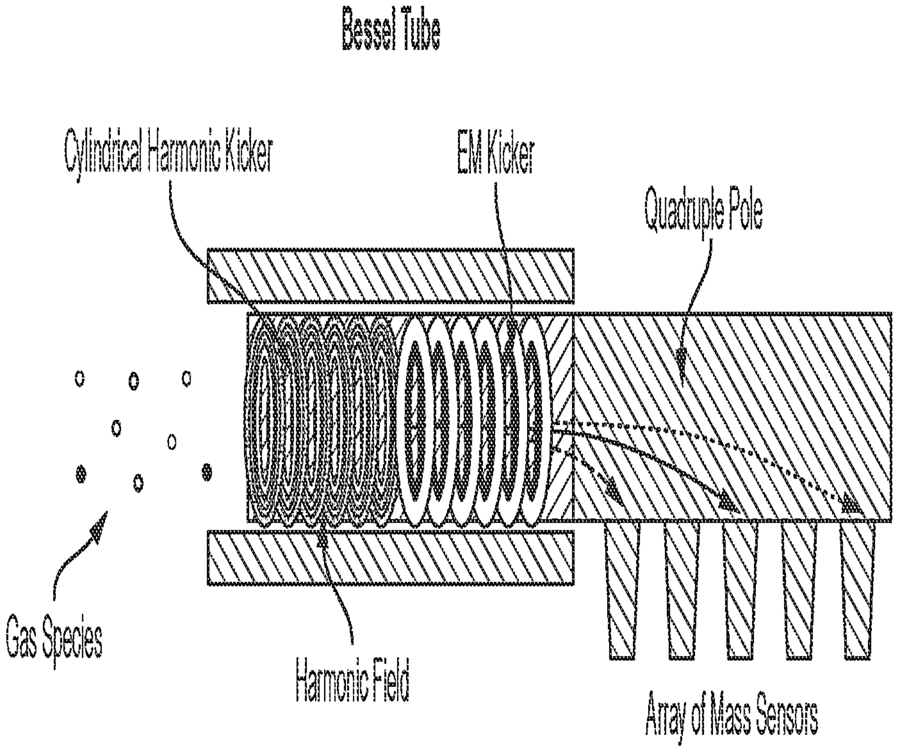
FIG. 8 is another view of a Bessel tube.

Accordingly using the principle of cylindrical harmonic condition, the technical aspect of Bessel Tube shown in FIG. 8 will drive particles with dipole moment, such as He-3, $H_2O$, $O_2$, $H_2$, through the drift axis of Bessel Tube. The CH condition may not be suitable for hydrogen and oxygen molecules unless these molecules are ionized. Hydrogen and oxygen molecules are regarded as homonuclear (nonpolar) molecules without electronegativity difference between H—H and O—O bindings. That is why these molecules need to be ionized for the Bessel tube. These molecules can be easily ionized by the electron beam or vacuum ultra-violet (VUV) light. Then these molecular ions (H+, H2+, O+, and O2+) can be easily driven by the cylindrical harmonic field.

A cylindrical harmonic generator with E-field can be fabricated and tested to accelerate gases through the drift axis. The ring field formation in a linear array forms a field pattern of cylindrical harmonic and hypocycloidal mode that will drive gases with dipole moment through the drift axis of Bessel tube. The gas molecules, driven by the gradient ring-fields in a serial mode along with the axial center, pass through a region where quadruple poles deviate the momentum of a molecule and cause a specific molecule to drop at a specific location based on the magnitude of momentum. Like the particles at mass spectrometer, a mixture of different molecules is separated into individual particle based on their mass through quadruple poles (EM kicker shown in FIG. 9). A molecule with high mass flies further distance than the one with light mass does. By this separation scheme, individual gas species are separately collected and stored in each container.

The Bessel Tube of the present invention is applicable on any given circumstance. As an example, the use of Bessel Tube on extreme case is described in the following paragraphs. The Bessel Tube can be used well on Moon even though there is no atmosphere and virtually vacuum ($10^{-12}$ torr). Solar flux has a combination of multi-spectral photons with photon energy roughly varying from 0.1 eV to 6 eV that can easily detach and remove molecules, such as $H_2O$, He-3, and/or other gaseous molecules that are dangling to regolith particles. The photon energy of solar spectrum is sufficiently high enough to easily break down the dangling bonds of gaseous molecules. With solar concentration, the increased number of photons that interact with dangling molecules will increase the breakdown probability of dangling bonds by the photon collision (or coupling) frequency (with high flux density of spectral lines) and subsequently by thermal effects too. Intensity of solar photons (0.1 eV~6 eV, here 1 eV is equivalent to 11,600 oK) is not high, but the concentrated solar flux increases the number of photons that can be incident on and coupled with gaseous molecules. If thermal effect only is used for detaching gaseous molecules dangling to lunar regolith, a large portion of thermal energy is simply consumed for heating regolith particles. Accordingly, the required energy is much more than necessary for breaking down of dangling bond of these molecules, since in this case thermal energy is consumed to heat up not only these molecules, but also the regolith particles which are much more massive than these molecules. Heating up of regolith takes more energy due to its large thermal mass.

The collection of detached molecules from regolith is not easy to fulfill since the environment on Moon is quite harsher than anticipated. It is virtually vacuum (10-12 torr), no atmospheric pressure and low gravity (1.62 m/s2). Any molecules released will have freely translational linear motions in all directions because of low collision probability that means no Brownian motion. The number of released molecules have very few to guide them to a direction using the conventional pressure differential. Accordingly, a new approach is necessary to capture and store the released gaseous molecules.

Figure 9:
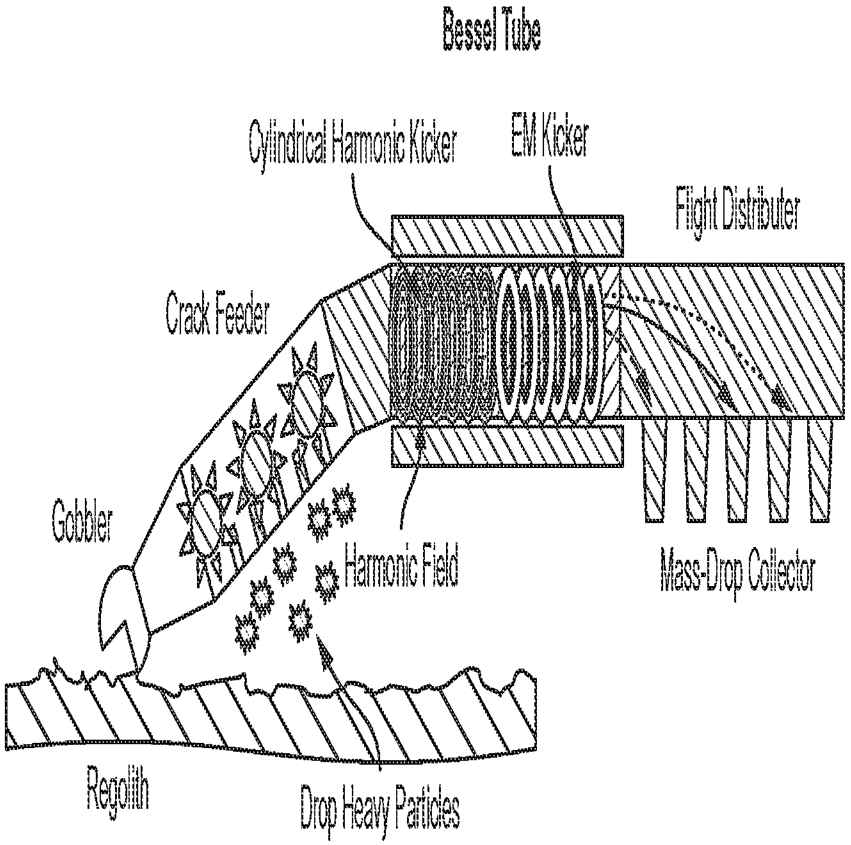
FIG. 9 is a view of a Bessel tube harvesting volatile elements.

The environments on Moon and Mars may not permit use of equipment developed for terrestrial applications. Specifically, the harvesting of gases, such as He-3, $H_2$, $O_2$, and water vapor, is not easy on the Moon-like environment of near vacuum ($10^{-12}$ torr). It is important to have onsite supply capability of valuable gases, such as He-3, $H_2$, $O_2$, and water vapor during lunar and Mars explorations for synthesis of propellants and $O_2$ and $H_2O$ for habitats. New technology developed for specifically harvesting gases on Moon is called as 'Bessel Tube' which is based on the principle of cylindrical harmonic generator. This equipment captures and accelerates gaseous elements through the drift axis of ring-field equipotential domain. The accelerated gaseous elements are eventually stored selectively into a bottle by induction field at the other end. FIG. 9 shows the use of the Bessel Tube for harvesting volatile elements from regolith.

The production of gaseous molecules by solar sintering technology together with a Bessel tube offers an added value to the scenario of solar sintering process. Collected gas molecules are very valuable and useful resources to enable propellant production and water supply required for space mission. Since the atmosphere of the Moon is very scant and almost vacuum (10-12 torr), there may be no possibility to harvest any gaseous molecules from Lunar atmosphere. However, there might be a measurable amount of trapped gaseous molecules into regolith due to the fact that the stream of electrons, protons, and helium from solar flare interacts with Lunar soil, mostly oxides, and splits oxides to generate oxygen atoms. These oxygen atoms can be coupled with proton to form hydroxyl (OH) and water molecules. Recently it has been determined that hydrogen atoms and molecules, or even $OH/H_2O$ are wide spread over Lunar surface.

TABLE 1

Nuclear Fusion reactions and Helium-3
Fusion reactions involving Helium-3

| Reactants | | Products | Q |
|---|---|---|---|
| First Generation Fuels | | | |
| ${}^{2}_{1}H + {}^{2}_{1}H$ | ? | ${}^{3}_{2}He + {}^{1}_{0}n$ | 3.268 MeV |
| ${}^{2}_{1}H + {}^{2}_{1}H$ | ? | ${}^{3}_{1}H + {}^{1}_{1}p$ | 4.032 MeV |
| ${}^{2}_{1}H + {}^{3}_{1}H$ | ? | ${}^{4}_{2}He + {}^{1}_{0}n$ | 17.571 MeV |
| Second Generation Fuel | | | |
| ${}^{2}_{1}H + {}^{3}_{2}He$ | ? | ${}^{4}_{2}He + {}^{1}_{1}p$ | 18.354 MeV |

TABLE 1-continued

Nuclear Fusion reactions and Helium-3
Fusion reactions involving Helium-3

| Reactants | | Products | Q |
|---|---|---|---|
| Third Generation Fuel | | | |
| $^{3}_{2}He + ^{3}_{2}He$ | ? | $^{4}_{2}He + 2^{1}_{1}p$ | 26.2 MeV |

Harvesting Helium-3: A study, based on the lunar regolith samples collected through Apollo-(11~17) missions and Lunar missions, reveals that the lunar soil regolith reserves roughly over 2 million tons of helium-3 (He-3). It is well-known that Helium-3 (He-3) is the only stable isotope of any element with more protons than neutrons. As listed in Table 1, the nuclear fusion of He-3+He-3 releases large amount of energy without emitting neutrons. However, the fusion of He-3 atoms requires very high temperature that is much higher than in other fusion reactions. Neutron absorption cause materials to become radioactive and to undergo nucleogenic or radiogenic process. But Helium-3 is known to be a fuel for aneutronic nuclear fusion for both reactions of deuterium and He-3: 18.3 MeV and He-3 atoms: 26.2 MeV, as shown in Table 1. The fact that aneutronic fusion process of He-3 enables extracting large amount of energy is very attractive for most of space fairing nations. These nations have expressed their interests in mining He-3 as a part of their Lunar exploration. He-3 has also a whole variety of other applications than as a fusion fuel, such as homeland security, national security, medicine, industry, and science. For example, He-3 is used for neutron detection by measuring the scintillation emission when high pressure He-3 absorbs neutrons. By the increased demands, currently the stockpile of He-3 has been dwindled drastically to roughly 50,000 liters by 2010 after when the production of He-3 was outpaced by the increased demand from 2001. Worse the matter, the projected He-3 demand in FY18 alone (100,000 liters) already exceeds the current stockpile and supply together. It was predicted that He-3 is going to be a pricey item that will exceed $3 bn/ton. It is known that the Moon has over a million tons of He-3. Anyway, the harvest of He-3 is a challenging venture that requires a huge amount of commitment in resources and scientific wisdom. When the solar sintering process is used on the Moon, the side track benefit of the mission is the harvesting of He-3.

Bessel Tube as a Sniff Atmospheric Sensor: The gaseous planets with thick and dense atmosphere in our solar system are Venus, Jupiter, Saturn, Uranus, and Neptune. Even some moons of these planets are known to have atmosphere. Titan, the largest moon of Saturn, is the only moon known to have a dense atmosphere. Since Titan shows clear evidence of stable bodies of surface liquid and water ice, it is possible to postulate any bio-activity on Titan by even analyzing the constituent gas species of Titan at a close proximity through a fly-by. The current gas species data of Titan's atmosphere was identified by spectrometers onboard Voyager I and Cassini spacecraft so far. The Titan's atmosphere is composed of nitrogen (97%), methane (2.7%) hydrogen (0.2%) and trace amounts of other gases. The measurement of gas species in these gas planets and moon can be easily done by an onboard Bessel tube sensor of fly-by spacecraft. The Bessel tube for this purpose can be slightly modified from the configuration appeared in FIG. 8 by simply removing the front end of the system, such as the gobbler and crack-feeder. FIG. 9 shows a Bessel tube miniaturized to a finger size.

Bessel Tube as a vacuum pump: Most of the conventional vacuum pumps are mechanical by rotating the rotor with vanes or turbine blades. These mechanical vacuum pumps are effective for a large volume displacement at high pressure, but noisy and bulky and heavy. Bessel tube can be used to pump out at any pressure, but the volume of displacement as a single unit is small compared to the conventional vacuum pumps. However, it can be designed as a bundle of Bessel tubes to displace even a large volume of gases. Terrestrial applications of Bessel tube, other than vacuum pumps, are ideal because of noiseless applications for high tech equipment, such as TEM and SEM.

The Bessel Tube according to the present invention has a hypocycloidal equipotential field driven particles mover into a drift axis. There are no moving parts, as the device is noiseless. It could be used as a replacement for vacuum pumps, for harvesting atoms and molecules and nano-scale particles. It could also be used for vacuum pumping transmission electron microscopes (TEM) and scanning electron microscopes (SEM), and for scientific equipment applications.

The many features and advantages of the described examples may be apparent from the detailed description and, thus, it is intended by the appended claims to cover all such features and advantages of the described examples that fall within the true spirit and scope thereof. Further, since numerous modifications and changes will readily occur to those skilled in the art, it is not desired to limit the examples to the exact construction and operation illustrated and described, and accordingly all suitable modifications and equivalents may be resorted to, falling within the scope thereof.

The invention claimed is:

1. A device comprising:

a plurality of ring electrodes arranged along an axis and configured such that, with an electrical voltage applied separately to each ring electrode of the plurality of ring electrodes a cylindrical harmonic field having equipotential field lines is formed, the cylindrical harmonic field configured to accelerate a charged particle therethrough by consecutive operation of attraction and repulsion forces between the charged particle and electrodes of the plurality of ring electrodes, wherein an electrical potential of the equipotential field lines is greater than a ground potential along a length of the cylindrical harmonic field.

2. The device of claim 1, wherein a same direct current electrical voltage is applied to each ring electrode of the plurality of ring electrodes.

3. The device of claim 1, wherein a direct current electrical voltage applied to a first ring electrode of the plurality of ring electrodes is different from a direct current electrical voltage that is applied to a second ring electrode of the plurality of ring electrodes.

4. The device of claim 1, wherein, with a direct current electrical voltage applied separately to each ring electrode of the plurality of ring electrodes, the cylindrical harmonic field is configured to create a drift axis along which the charged particle is aligned and accelerated.

5. The device of claim 1, wherein the plurality of ring electrodes is further configured such that the electrical voltage is appliable sequentially to electrodes of the plurality of ring electrodes along the axis such that, with the electrical voltage applied sequentially to the electrodes, the cylindrical harmonic field is configured to accelerate a charged particle therethrough is formed parallel to the axis.

6. The device of claim 1, further comprising:

a plurality of electrical lead wires connecting a ring electrode of the plurality of ring electrodes to a power supply, the plurality of electrical lead wires equidistantly spaced along a circumference of the ring electrode.

7. The device of claim 1, wherein a gap is formed between adjacent ring electrodes of the plurality of ring electrodes, and the gap is configured such that superposition of electric fields of the adjacent ring electrodes occurs in the gap to thereby form a wide field channel.

8. The device of claim 1, wherein a gap is formed between adjacent ring electrodes of the plurality of ring electrodes such that a plurality of gaps respectively corresponding to a number of adjacent ring electrodes is formed, and the formed equipotential field lines includes:

a plurality of narrow field channels corresponding to ring electrodes of the plurality of ring electrodes, and a plurality of wide field channels respectively corresponding to the plurality of gaps.

9. A method of a device that includes a plurality of ring electrodes arranged along an axis, the method comprising:

applying an electrical voltage to each ring electrode of the plurality of ring electrodes to form a cylindrical harmonic field having equipotential field lines that includes a drift axis, the equipotential field lines having an electrical potential that is greater than a ground potential along a length of the cylindrical harmonic field; and aligning and accelerating a charged particle in a direction parallel to the drift axis by consecutive operation of attraction and repulsion forces between the charged particle and electrodes of the plurality of ring electrodes.

10. The method of claim 9, wherein the charged particle has a pressure of about $10^{-7}$ to about $10^{-3}$ mbar.

11. The method of claim 9, wherein the applying the electrical voltage includes applying a same direct current voltage to each ring electrode of the plurality of ring electrodes.

12. The method of claim 9, wherein the applying the electrical voltage includes applying a direct current electrical voltage to a first ring electrode of the plurality of ring electrodes that is different than a direct current electrical voltage that is applied to a second ring electrode of the plurality of ring electrodes.

13. The method of claim 9, wherein the applying the electrical voltage includes applying a gradually increasing or gradually decreasing direct current electrical voltage to at least one ring electrode of the plurality of ring electrodes.

14. The method of claim 9, wherein the applying the electrical voltage includes applying the electrical voltage sequentially from a first ring electrode of the plurality of ring electrodes to a last ring electrode of the plurality of ring electrodes.

* * * * *